July 27, 1926.
P. EVANS
1,594,160
OILING SYSTEM
Filed Dec. 16, 1919    3 Sheets-Sheet 3
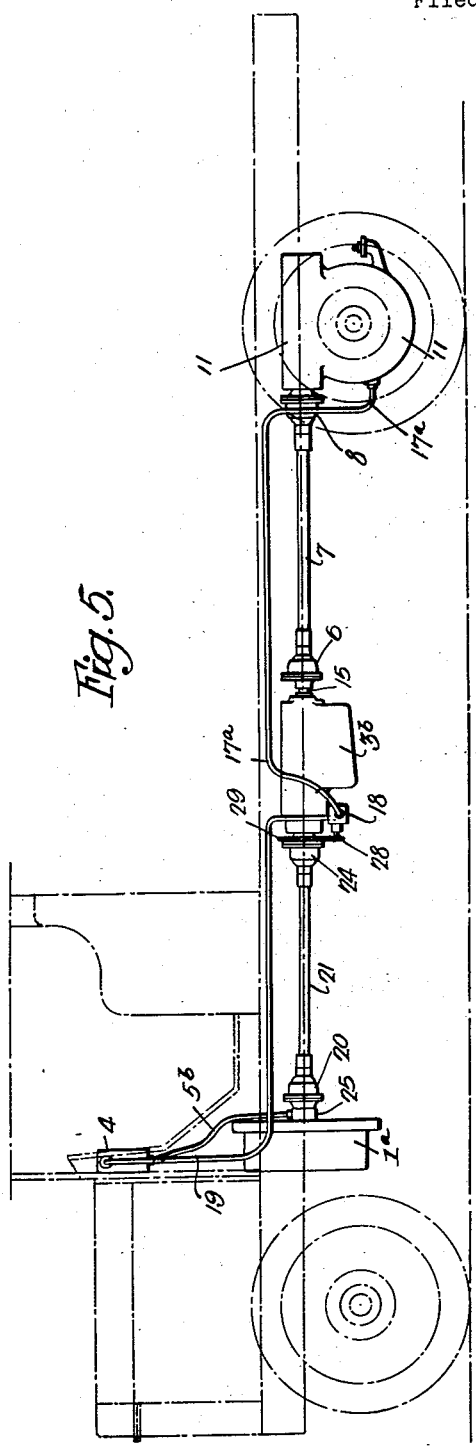
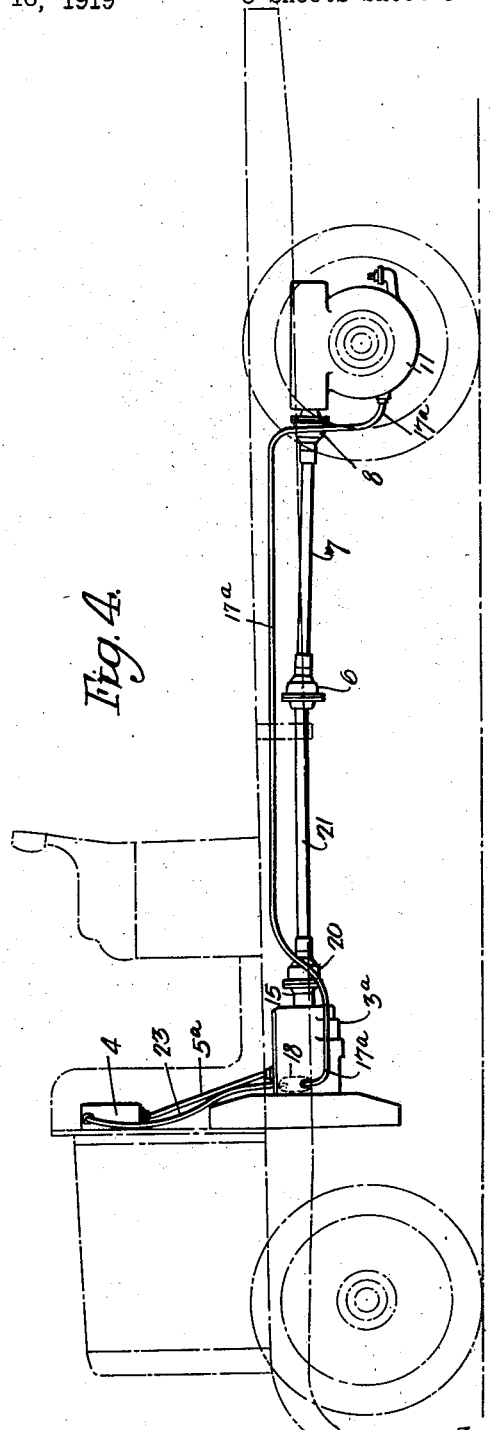
Inventor—
Powell Evans.
by his Attorneys
Howson & Howson Patented July 27, 1926.

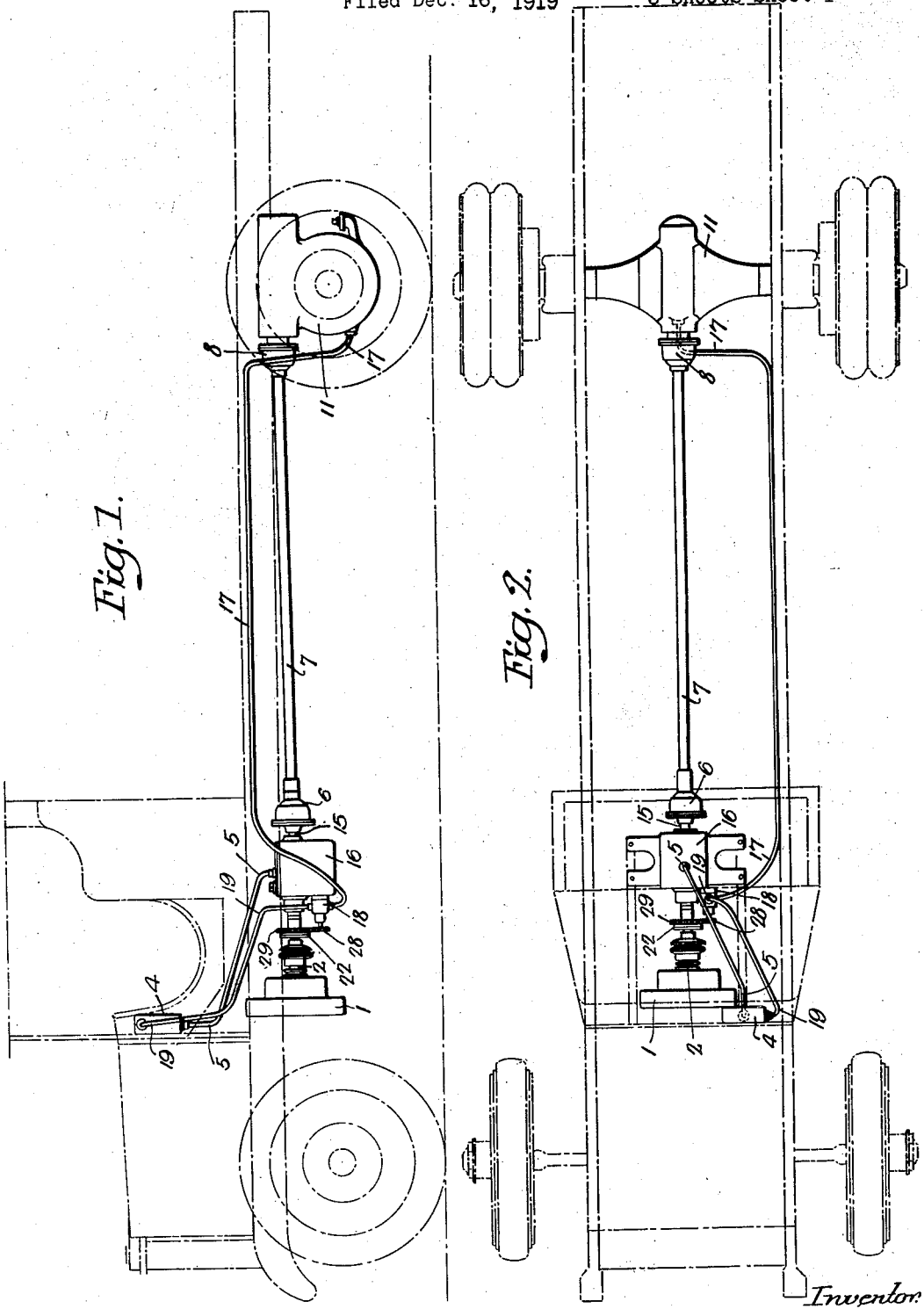

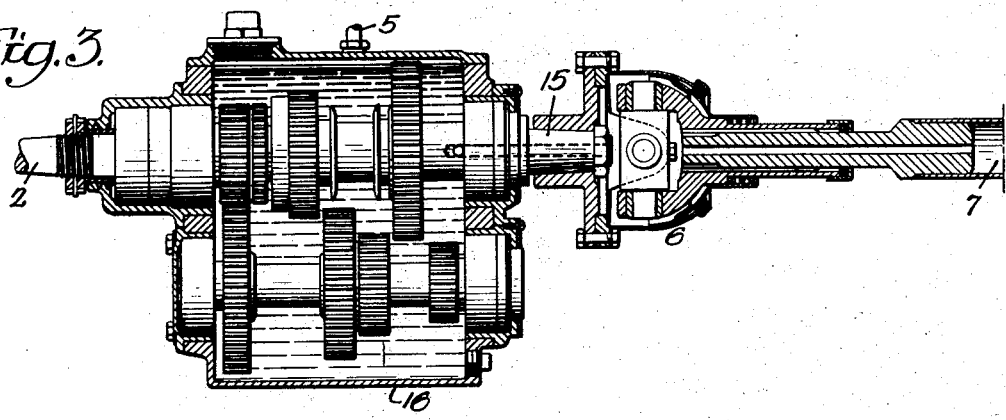
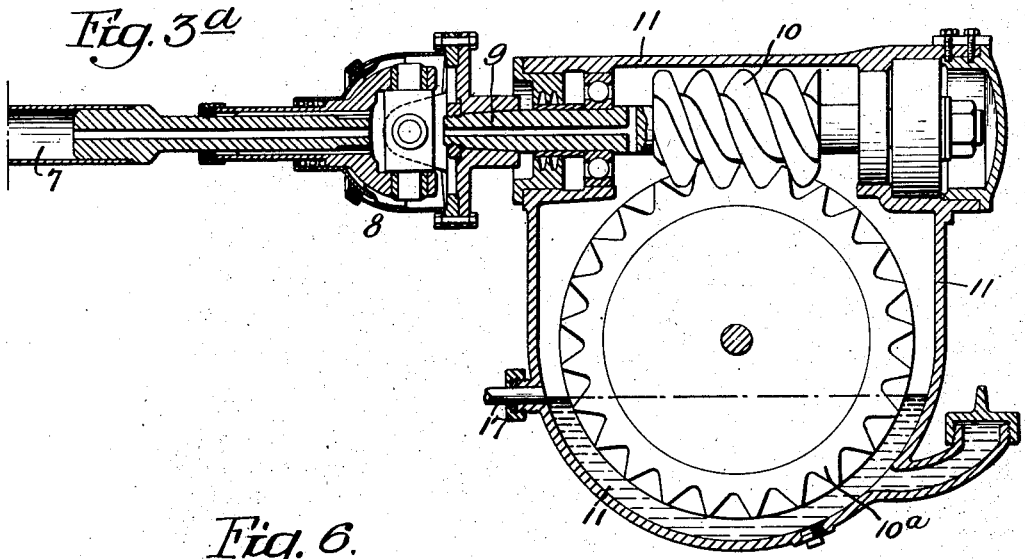
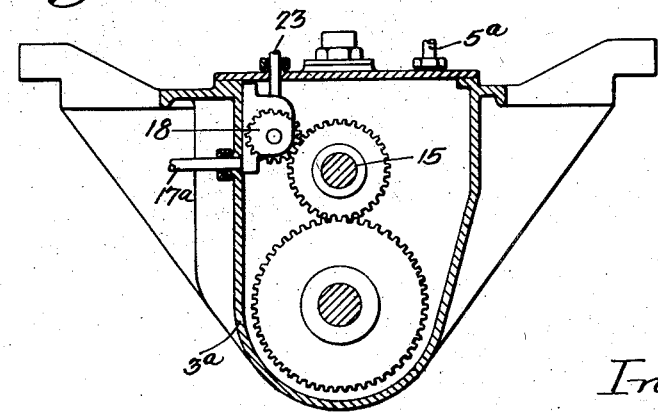

1,594,160

UNITED STATES PATENT OFFICE.

POWELL EVANS, OF PHILADELPHIA, PENNSYLVANIA.

OILING SYSTEM.

Application filed December 16, 1919. Serial No. 345,313.

One object of my invention is to provide a simple, compact and reliable combination of apparatus primarily designed to insure the lubrication of the mechanism comprising the power transmission system of a motor vehicle,—the invention more particularly contemplating means for insuring the circulation of lubricant through the several universal joints, shafts and gearing trains of such a system.

A further object of the invention is the provision of novel means for supplying lubricant to or circulating it through a universal joint while this is in operation, the invention in one of its embodiments contemplating an arrangement for insuring a substantially constant head of oil on the parts to be lubricated, which at the same time will permit the rate of feed to be conveniently observed.

These objects and other advantageous ends I attain as hereinafter set forth, reference being had to the accompanying drawings, in which, Fig. 1 is a side elevation, partly in section and to some extent diagrammatic, illustrating a transmission system equipped with an oiling system in accordance with my invention.

Fig. 2 is a plan of the apparatus shown in Fig. 1.

Figs. 3 and 3ª are longitudinal sections on an enlarged scale, illustrating details of the mechanism shown in Figs. 1 and 2;

Figs. 4 and 5 are side elevations similar to Fig. 1, illustrating modifications of my invention; and Fig. 6 is a vertical section on an enlarged scale, showing the pump as mounted within the gear casing.

In Figs. 1 to 3 of the above drawings, 1 represents the clutch of a power transmission system which also includes a change speed gearing enclosed in a casing 16 and connected to the clutch through a short primary shaft 2. The driven secondary shaft 15 of the change speed gear, through a universal joint 6, a transmission shaft 7, and a second universal joint 8, is connected to a shaft 9 to which is fixed a worm 10 meshing with a worm wheel 10ª, in a casing 11, constituting in the present instance the rear axle of a motor vehicle.

In accordance with my invention the universal joints 6 and 8 are enclosed within or include liquid tight casings such as that described and claimed in United States Patent No. 1,361,573, to Poul Flamand, dated December 7, 1920, and the shaft 7 is tubular so that it constitutes a conduit connecting the said casings;—it being noted that the main or body portion of said shaft is hollow and of an internal diameter greater than that of the ends so that it constitutes a lubricant reservoir of relatively large capacity. The driven shaft 15 of the change speed gear is provided with a longitudinally extending oil passage opening within the interior of the change speed gear casing and also within the casing of the universal joint 6. Likewise the casing of the universal joint 8 is connected through a passage in the shaft 9 with the interior of the casing 11 constituting the rear axle and the various parts are so designed that there is no material leakage of liquid from any part of said system.

In that arrangement of parts shown in Figs. 1 and 2 a flexible conduit 17 connects the lower portion of the axle casing 11 with the intake of a pump 18 whose delivery conduit 19 discharges into the upper portion of a reservoir 4 mounted at some conveniently accessible point on the vehicle at a suitable height above the mechanism to be lubricated. From the bottom of this reservoir a conduit 5 runs to the top of the casing 16 of the change speed gear. The pump is driven through two coacting gears 28 and 29 of which the latter is shown as fixed to the flange of a collar 22 on the shaft 2.

In putting the above described system into condition for operation I preferably fill the casing 16 of the change speed gear with heavy oil or other suitable liquid lubricant to a level somewhat above that of the shafts 2 and 15 and the axle casing 11 is likewise filled with liquid lubricant to a level above that of the intake to the pipe 17.

When the apparatus comprising the transmission system is put in operation, the pump 18 is driven, so that lubricant is drawn thereby through the pipe 17 from the source provided by the axle casing 11 and is delivered into the reservoir 4 where its flow may be conveniently observed by the operator of the vehicle. From here it flows under a head dependent on the height of said reservoir, to the casing 16 of the change speed gear mechanism from whence it passes through the shaft 15 into the universal joint 6, the shaft 7, the universal joint 8 and the shaft 9 back to the axle casing 11. The intake of the pipe 17 is at such a point in the casing 11 that all of the oil cannot be withdrawn by the pump 18, so that there is at all times a quantity of such oil in said casing sufficient to provide for proper lubrication of the mechanism therein. Moreover the hollow body of the shaft 7 retains a relatively large quantity of lubricant as does also the casing 16 of the change speed gear.

In Fig. 4 I have illustrated my invention as applied to the power transmission system of a motor vehicle having three universal joints 20, 6 and 8 and two shafts 21 and 7, connecting the driven shaft 15 of a change speed gear within a casing 3ª with the worm shaft 9 of the driving mechanism contained within the axle casing 11. Both of the shafts 21 and 7 have the same tubular construction which characterizes the shaft 7 in that form of my invention shown in Fig. 1, and the three universal joints each have axial passages which, with those of said shafts, provide a channel connecting the casing 3ª of the change speed gear with the axle casing 11.

While it is obvious that the pump for causing circulation of lubricant may be driven from any suitable point of the power transmission system of the vehicle or may be actuated by any other suitable motive power, I have shown it in this instance as mounted within the casing 3ª for the change speed gear (Fig 6). As before this pump is connected through a conduit 17ª with a point in the lower portion of the axle casing 11 and is designed to discharge through a pipe 23 into the upper part of the reservoir 4 mounted upon the dash board or at any other convenient point where the flow of liquid may be noted.

From the bottom of this reservoir a conduit 5ª leads to the upper part of the casing of the change speed gear 3ª, so that under operating conditions the pump 18 will draw lubricant from the lower portion of the axle casing 11 through the pipe 17ª, and will discharge it into the upper part of the reservoir 4 where its rate of flow may be conveniently observed. From said reservoir it passes into the casing of the change speed gear, thence through the channel in the shaft 15 to the universal joint 20, through the shaft 21, universal joint 6, shaft 7, and universal joint 8, through the worm shaft into the axle casing 11.

In that form of power transmission system shown in Fig. 5, I employ two universal joints 20 and 24 and a shaft 21 to connect the clutch 1ª with the driven shaft of the change speed gear within the casing 3ᵇ, and connect the driven shaft of said gearing through the universal joints 6 and 8 and the shaft 7 with the worm shaft 9, which actuates the mechanism in the axle casing 11. In this case as in the combination shown in Fig. 4, the two shafts 21 and 7 are tubular, although the conduit 5ᵇ leading from the reservoir 4 delivers lubricant to the interior of the universal joint 20 through a fixed collar 25 into the short shaft section (not shown) which connects said joint and said clutch.

The pump 18 is driven by gears 28 and 29 actuated from the driving shaft 14 of the change speed gearing and discharges into the upper part of the reservoir 4. The shafts 21, 2, 14 and 15 being tubular, lubricant flows from the reservoir 4 under a head dependent upon the height of this latter above the transmission mechanism, to the collar 25 and thence through the shaft connecting the clutch 1ª with the universal joint 20, passing from this latter through the shaft 21 and universal joint 24 into the casing 3ᵇ of the speed change gear. From this it flows into the universal joint 6, through the shaft 7, universal joint 8, worm shaft 9, and thence into the rear axle casing.

By the operation of the pump the surplus lubricant above the predetermined level which is necessarily maintained in the axle casing 11, is delivered to the reservoir 4, so that the lubrication of the elements of the power transmission mechanism is assured and the rate at which the oil is circulated may be noted by observing the discharge from the pump 18 into the reservoir 4. It is thus possible to insure adequate lubrication of the universal joints while these are in operation, and without the necessity of individually filling them by hand. Moreover it is possible to add any lubricant required from time to time by delivering it directly to the reservoir 4, from whence it flows under the action of gravity to all the elements of the system. Not only is the labor of inspection and maintenance materially lessened by the use of my apparatus but at any time the operator may assure himself of the certainty of the proper lubrication of all parts of the system merely by ascertaining that the oil is flowing out of the reservoir to the first transmitting element and is returned thereto by the pump. While the withdrawal of oil by the pump from the axle casing 11 stops when the level has fallen to the predetermined safe point, it quickly rises again and is put into circulation as it drains into said casing through the tubular power-transmitting elements connected thereto.

I claim:

1. The combination in a motor vehicle, of a transmission mechanism including a primary shaft and a hollow secondary shaft, a casing for the transmission mechanism, a hollow transmission shaft extending rearward from the transmission mechanism, a universal joint connecting the said secondary shaft with the said transmission shaft, and an oil-tight casing surrounding the universal joint and connected with the hollow secondary shaft to receive oil therefrom, the said casing having an oil-tight joint with the exterior of the universal drive shaft whereby it is adapted to deliver oil to the interior thereof.

2. The combination in a motor vehicle, of a transmission mechanism including a primary shaft and a secondary shaft, a casing for the transmission mechanism, an axle and axle driving mechanism including a drive shaft, a casing for the axle mechanism, a hollow transmission shaft interposed between the transmission mechanism and the axle driving mechanism, universal joints respectively connecting the said secondary shaft with the transmission shaft and the transmission shaft with the axle drive shaft, and oil-tight casings respectively surrounding the universal joints and respectively associated with the transmission casing to receive oil therefrom and with the axle casing to deliver oil thereto, the last said casings having oil-tight joints with the exterior of the transmission shaft at the respective ends thereof whereby one of them is adapted to deliver oil to the interior thereof and the other of them is adapted to receive oil from the interior thereof.

3. The combination in a motor vehicle, of a transmission mechanism including a primary shaft and a hollow secondary shaft, a casing for the transmission mechanism, an axle and axle driving mechanism including a hollow drive shaft, a casing for the axle driving mechanism, a hollow transmission shaft interposed between the transmission mechanism and the axle driving mechanism, universal joints respectively connecting the said secondary shaft with the transmission shaft and the transmission shaft with the axle drive shaft, and oil-tight casings respectively surrounding the universal joints and respectively connected with the said secondary shaft to receive oil therefrom and with the axle drive shaft to deliver oil thereto, the last said casings having oil-tight joints with the exterior of the transmission shaft at the respective ends thereof whereby one of them is adapted to deliver oil to the interior thereof and the other of them is adapted to receive oil from the interior thereof.

4. The combination of change speed gearing having a casing; an axle casing; wheel driving mechanism in the latter casing; mechanism connecting the change speed gearing with the wheel driving mechanism and provided with oil conveying passages; a pump; and conduits connecting the pump to the two casings for circulating oil through said apparatus.

5. The combination in a motor vehicle, of a transmission mechanism including a primary shaft and a secondary shaft, a casing for the transmission mechanism, an axle and axle driving mechanism including a drive shaft, a casing for the axle mechanism, a hollow transmission shaft interposed between the transmission mechanism and the axle driving mechanism, universal joints respectively connecting the said secondary shaft with the transmission shaft and the transmission shaft with the axle drive shaft, oil-tight casings respectively surrounding the universal joints and respectively associated with the transmission casing to receive oil therefrom and with the axle casing to deliver oil thereto, the last said casings having oil-tight joints with the exterior of the transmission shaft at the respective ends thereof whereby one of them is adapted to deliver oil to the interior thereof and the other of them is adapted to receive oil from the interior thereof, and means supplemental to the transmission shaft for returning oil from the axle casing to the transmission casing and thus maintaining a circulation.

6. The combination in a motor vehicle, of a transmission mechanism including a primary shaft and a secondary shaft, a casing for the transmission mechanism, an axle and axle driving mechanism including a drive shaft, a casing for the axle mechanism, a hollow transmission shaft interposed between the transmission mechanism and the axle driving mechanism, universal joints respectively connecting the said secondary shaft with the transmission shaft and the transmission shaft with the axle drive shaft, oil-tight casings respectively surrounding the universal joints and respectively associated with the transmission casing to receive oil therefrom and with the axle casing to deliver oil thereto, the last said casings having oil-tight joints with the exterior of the transmission shaft at the respective ends thereof whereby one of them is adapted to deliver oil to the interior thereof and the other of them is adapted to receive oil from the interior thereof, and means supplemental to the transmission shaft for withdrawing oil from the axle casing at a point above a predetermined safe level therein and returning the oil to the transmission casing.

7. The combination in a motor vehicle, of a transmission mechanism including a primary shaft and a secondary shaft, a casing for the transmission mechanism, an axle and axle driving mechanism including a drive shaft, a casing for the axle mechanism, a hollow transmission shaft interposed between the transmission mechanism and the axle driving mechanism, universal joints respectively connecting the said secondary shaft with the transmission shaft and the transmission shaft with the axle drive shaft, oil-tight casings respectively surrounding the universal joints and respectively associated with the transmission casing to receive oil therefrom and with the axle casing to deliver oil thereto, the last said casings having oil-tight joints with the exterior of the transmission shaft at the respective ends thereof whereby one of them is adapted to deliver oil to the interior thereof and the other of them is adapted to receive oil from the interior thereof, and means supplemental to the transmission shaft for returning oil from the axle casing to the transmission casing and thus maintaining a circulation, the said means including a reservoir located at a convenient point of observation on the vehicle and pipes leading to and from the reservoir.

In witness whereof I affix my signature.

POWELL EVANS.